(12) United States Patent
Shetty et al.

(10) Patent No.: US 11,782,948 B2
(45) Date of Patent: Oct. 10, 2023

(54) PROCESSING CARTESIAN COLUMNS IN ANALYTICS APPLICATIONS

(71) Applicant: SAP SE, Walldorf (DE)

(72) Inventors: Arpitha A Shetty, Dakshina Kannada (IN); Devicharan Vinnakota, Bangalore (IN); Sanjay S, Bangalore (IN); Amrita Prabhakaran, Bangalore (IN); Vijaya Pramilamma Bovilla, Badvel (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/498,678

(22) Filed: Oct. 11, 2021

(65) Prior Publication Data

US 2022/0398253 A1  Dec. 15, 2022

(30) Foreign Application Priority Data

Jun. 10, 2021  (IN) .............................. 202111025784

(51) Int. Cl.
| | | |
|---|---|---|
| *G06F 15/16* | (2006.01) | |
| *G06F 16/26* | (2019.01) | |
| *G06F 16/27* | (2019.01) | |
| *G06F 16/2455* | (2019.01) | |

(52) U.S. Cl.
CPC .......... *G06F 16/26* (2019.01); *G06F 16/2456* (2019.01); *G06F 16/27* (2019.01)

(58) Field of Classification Search
None
See application file for complete search history.

(56) References Cited

U.S. PATENT DOCUMENTS

| | | | | |
|---|---|---|---|---|
| 2011/0035744 A1* | 2/2011 | Bhatia | ................... | G06F 16/252 |
| | | | | 717/174 |
| 2012/0054174 A1* | 3/2012 | Gagnier | .............. | G06F 16/2457 |
| | | | | 707/E17.054 |
| 2019/0294613 A1* | 9/2019 | Sullivan | .............. | G06F 16/2455 |

* cited by examiner

*Primary Examiner* — Alex Gofman
(74) *Attorney, Agent, or Firm* — Klarquist Sparkman, LLP (57) ABSTRACT

Systems, methods, and computer media for visualizing data are provided herein. The described examples allow one-dimensional data visualizations generated using visualization tools and backend components to be displayed in response to a request to view data that includes one or more sets of Cartesian columns. A data visualization request can specify data for inclusion in a data visualization and properties for the visualization, including transpose factors for data sources. The data sources having transpose factors can be cloned to represent respective combinations of the data source with each transpose factor, and then joined to other cloned or non-cloned data sources to generate the resulting one-dimensional visualization.

20 Claims, 11 Drawing Sheets

| QUERY DESIGNER | | |
|---|---|---|
| ²² MAX_RATE-New01 | | ²² MAX_RATE-New03 |
| 20 | | 20 |
| 28 | | 28 |
| 38 | | 38 |
| 50 | | 50 |
| 90 | | 90 |

PROCESSING CARTESIAN COLUMNS IN ANALYTICS APPLICATIONS

CROSS-REFERENCE TO RELATED APPLICATIONS

This application claims the benefit of Indian Patent Application No. 202111025784, filed Jun. 10, 2021, which application is incorporated herein by reference in its entirety.

BACKGROUND

Financial reporting, records management, and other analysis applications often accept input data that is related to and/or that can be cross-correlated with other input data. When inputting the data as distinct columns, however, these relationships and/or correlations may be difficult to visualize and process in such a configuration. As the number of related columns increases, the difficulty in processing cross-correlations between the columns can increase exponentially. Accordingly, there remains a need for improved technologies to manage data processing and visualization in such applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In summary, the detailed description is directed to various innovative technologies for managing, processing, and generating display information relating to data input into cartesian columns. In some examples, the disclosed technologies can be implemented as a method performed by a computer. The method may include, based on a request for a visualization of data from a plurality of data sources received through a visualization tool, providing the data from the plurality of data sources to a replication module, the request specifying a number of transpose factors for at least a first data source of the plurality of data sources, cloning, with the replication module, the first data source to generate a number of clones of the first data source that is equal to the number of transpose factors, each clone of the first data source corresponding to a combination of the first data source and a respective one of the transpose factors, and joining, with a join module, the clones of the first data source with remaining data sources of the plurality of data sources according to a set of rules to generate a visualization of the data. The method may further include generating for display a report including the visualization of the data from the plurality of data sources, the visualization presenting the data in a flat, one-dimensional format.

In some examples, the disclosed technologies can be implemented as computer-readable media storing instructions which, when executed by one or more hardware processors, cause the hardware processors to perform the following actions: generating a graphical user interface for display, the graphical user interface comprising selectable user interface objects respectively corresponding to each of a plurality of data sources, generating a request for a visualization of data from a subset of the plurality of data sources that are selected via user input, the request specifying a number of transpose factors for at least a first data source of the subset of data sources based on further user input to a dialog box that is generated responsive to a selection of the first selectable user interface object corresponding to the first data source, providing the request indicating the data from the subset of data sources and the transpose factors to a backend service including a replication module and a join module, receiving, from the backend service, a visualization of the data from the subset of data sources, the visualization showing the data in a flat, one-dimensional format, and presenting, in the graphical user interface, a report including the visualization of the data.

In some examples, the disclosed technologies can be implemented in a system including one or more hardware processors with coupled memory, and computer-readable media storing instructions executable by the one or more hardware processors. The instructions, when executed by the one or more hardware processors, perform operations including: generating a graphical user interface for display, the graphical user interface comprising selectable user interface objects respectively corresponding to each of a plurality of data sources, generating a request for a visualization of data from a subset of the plurality of data sources that are selected via user input, the request specifying a number of transpose factors for at least a first data source of the plurality of data sources based on additional user input to a dialog box that is generated responsive to a selection of the first selectable user interface object corresponding to the first data source, cloning, with a replication module, the first data source to generate a number of clones of the first data source that is equal to the number of transpose factors, each clone of the first data source corresponding to a combination of the first data source and a respective one of the transpose factors, joining, with a join module, the clones of the first data source with remaining data sources of the subset of data sources according to a set of rules to generate a visualization of the data, wherein the subset of data sources are joined with one another in positions that are defined based on the user input selecting the user interface objects for the subset of data sources, and generating for display via the graphical user interface a report including the visualization of the data from the subset of data sources, the visualization presenting the data in a flat, one-dimensional format.

The foregoing and other objects, features, and advantages of the invention will become more apparent from the following detailed description, which proceeds with reference to the accompanying figures.

DETAILED DESCRIPTION

Applications that provide reports of data from multiple data sources may present such data as columns of values, where each column represents values corresponding to a different one of the data sources (or a different type/category of data in the data sources). However, there may be some columns whose meaning makes more sense when they are joined with other related columns. For example, in a human resource environment, a "Pay" column may not make individual sense but instead may be typically reported/analyzed in combination with other columns such as "Pay for Full time Employee," "Pay for Day time Employee," "Monthly Pay," "Annual Pay," etc. The above described columns are examples of cartesian columns, where a column can be mapped to various other columns and the resulting values would differ.

Figure 1:
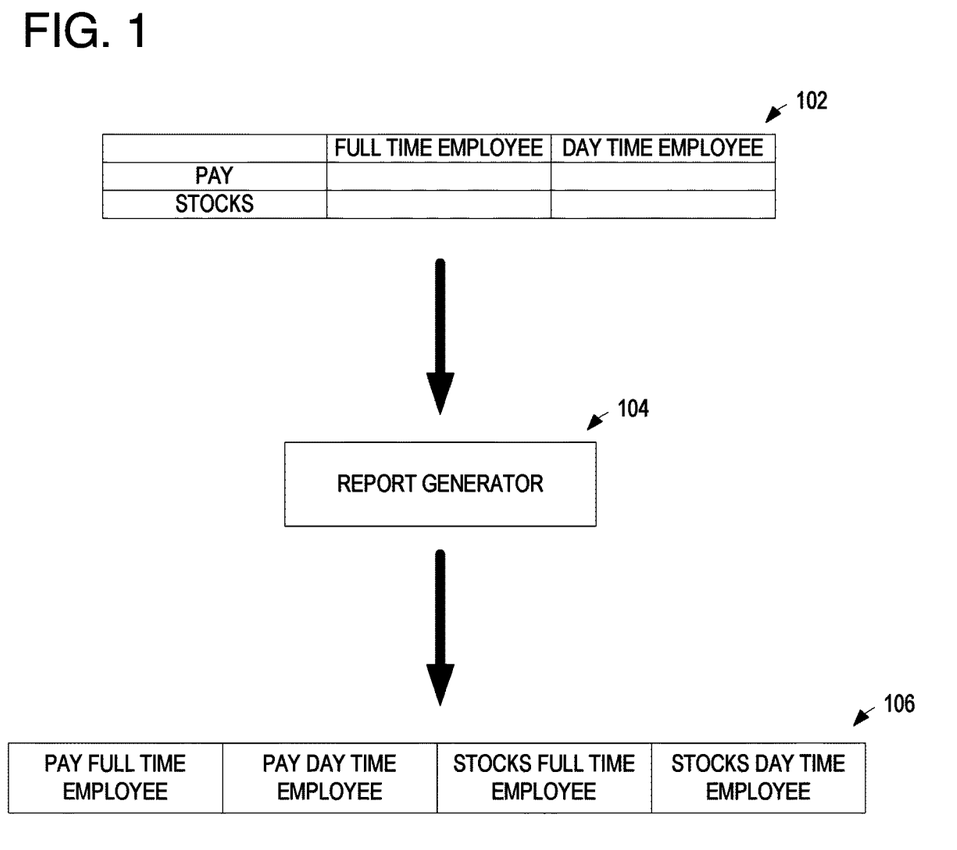
FIG. 1 shows an example translation of a set of Cartesian columns to a one-dimensional visualized reporting of data.

Handling a cartesian column in an analytical application is often a big challenge. A cartesian column refers to a column that is mapped with one or more other columns, which together provide a meaningful report of data. The data for the multi-dimensional charting may be derived from multiple data sources, and a final report may be desired to be visualized in a flat, one-dimensional format. For example, FIG. 1 shows input two-dimensional cartesian columns 102, which may be input into a report generator 104 to provide the resulting flat/one-dimensional output 106. The disclosure provides examples for handling cartesian columns both on the user interface side and the backend processing side of an application.

First Example System

Figure 2:
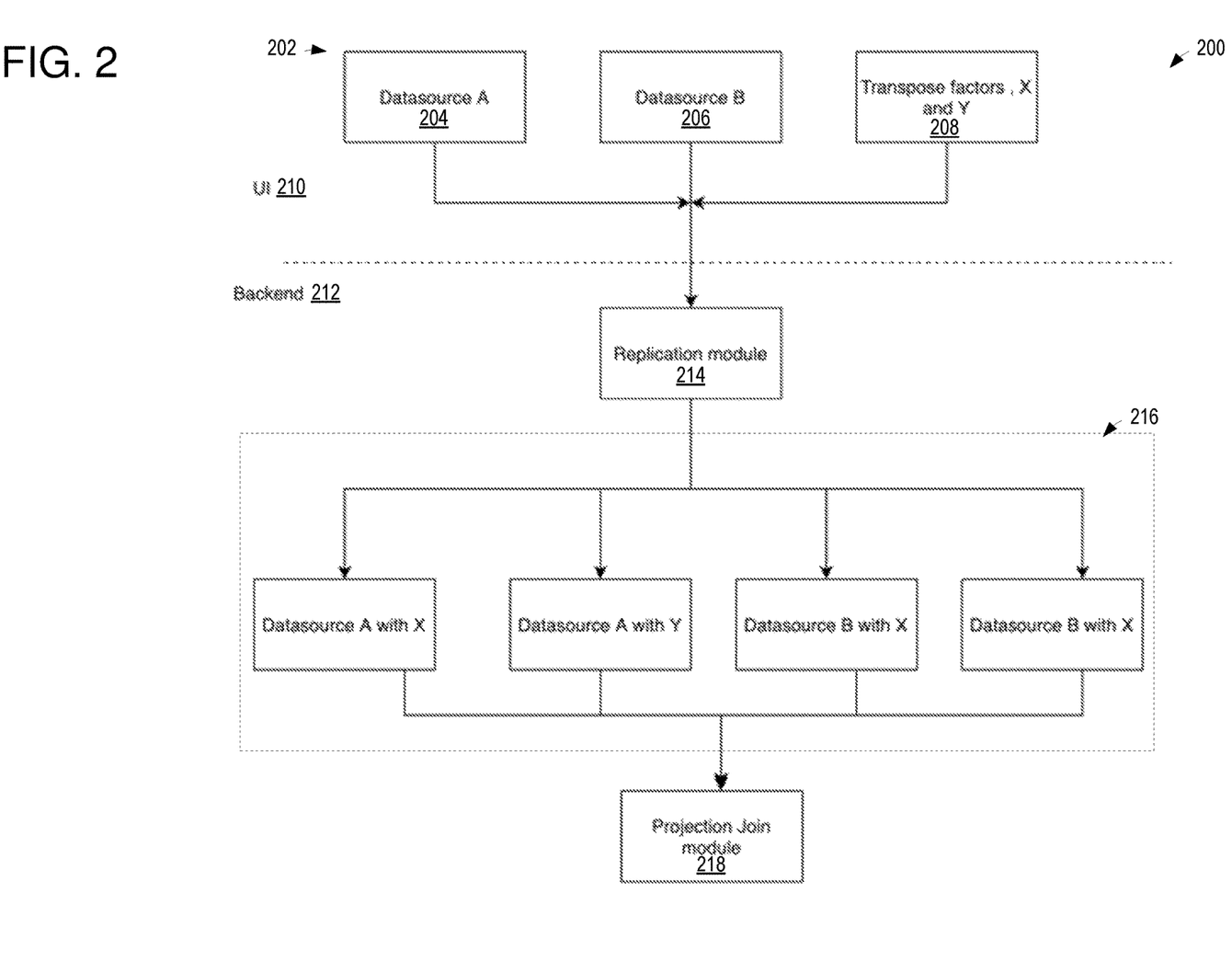
FIG. 2 shows an example system for translating a set of Cartesian columns to generate a one-dimensional visualized reporting of data.

FIG. 2 shows an example block diagram of a system 200 for building cartesian columns for outputting in a visualized report. As shown, a plurality of data sources 202 (e.g., Data source A 204 and Data source B 206), as well as transpose factors X and Y 208 (e.g., sub-categories or values for the categories in Data source A and/or B) are available to be accessed via a user interface (UI) 210 to generate a report. In order to format the report in a targeted configuration (e.g., a flat representation of cartesian columns of data), a backend 212 includes a replication module 214 for cloning/replicating data sources in accordance with the transpose factors (as represented by the operations in 216) and a projection join module 218 for joining the cloned/replicated data sources. Examples of operations performed by the replication module are described below with respect to FIG. 3, and examples of operations performed by the join module are described below with respect to FIG. 4.

First Example Method—Replication Module

Figure 3:
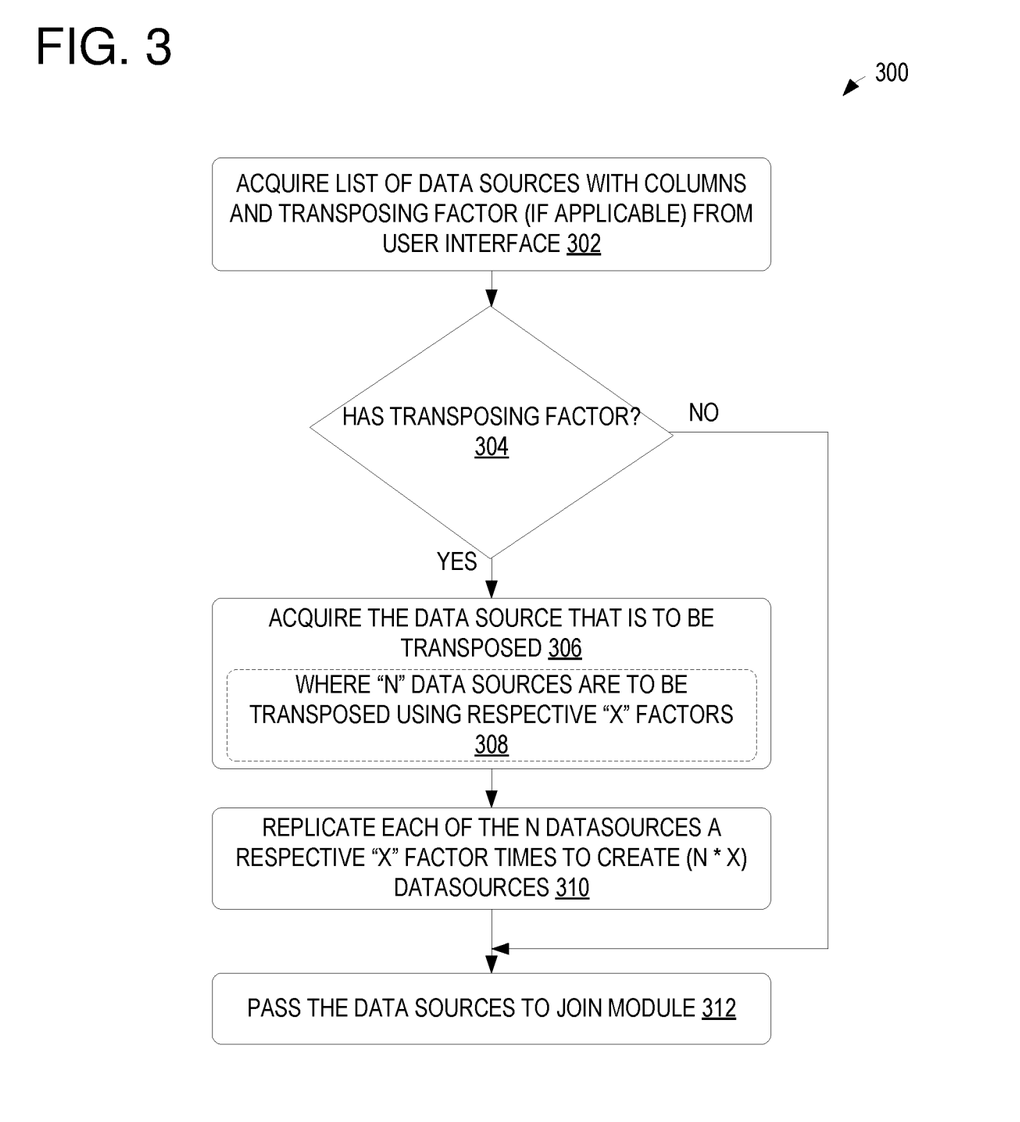
FIG. 3 is a flow chart of an example method for replicating data sources in order to generate a one-dimensional visualized reporting of data.

FIG. 3 is a flowchart of an example method 300 for determining whether Cartesian columns are to be processed for visualizing/reporting entered data. The method 300 may be performed by a replication module (e.g., as described above with respect to FIG. 2). At 302, the method includes acquiring a list of data sources with columns and transposing factor(s) (if applicable) from a user interface. For example, as shown in FIG. 2, values for a Cartesian column to be reported may be stored or arranged in different data sources (e.g., Data sources A and B in the example of FIG. 2) and one or more of the data sources may include transpose factors (e.g., different categories or sub-categories of the content in the respective data sources, such as transpose factors X and Y of FIG. 2).

At 304, the method includes determining if the input data has one or more transposing factors. If the data does not include transposing factors, the method includes passing the data sources acquired at 302 to a join module as indicated at 312. The join module operations are described in more detail below with respect to FIG. 4.

If the data includes transposing factors (e.g., "YES" at 304), the method includes acquiring the data source that is to be transposed, as indicated at 306. As noted at 308, the data sources to be transposed may include N data sources, each of which are to be transposed using a respective number (e.g., X) of transpose factors.

At 310, the method includes replicating the N data sources X factor times (respectively) to create an N times X data source. The generated N times X data source may correspond to created cartesian columns that are to be flattened by the join module (as described below). As indicated above, at 312, the method includes passing the data source (e.g., the N times X data source) to the join module.

An example replication scenario using two data sources (A and B), each having a respective transpose factor (X and Y, respectively) follows. First, a list of the data sources A and B are received, along with the transpose factors X and Y from the UI. The module checks if the transpose factors are available, and the replication may only be performed when the transpose factors are present. In order to maintain the semantics of A and B, these data sources are cloned. Cloning or replicating is thus based on the number of transpose factors (e.g., X and Y). Hence, data sources are created based on the number of transpose factors. So, in this example, the number of created data sources is the number of data sources that need transposing (e.g., 2 in this example) multiplied by the number of transposes (e.g., 2 in this example). After the replication modules are done, this is passed to the join module to join properly.

Second Example Method—Joining Module

Figure 4:
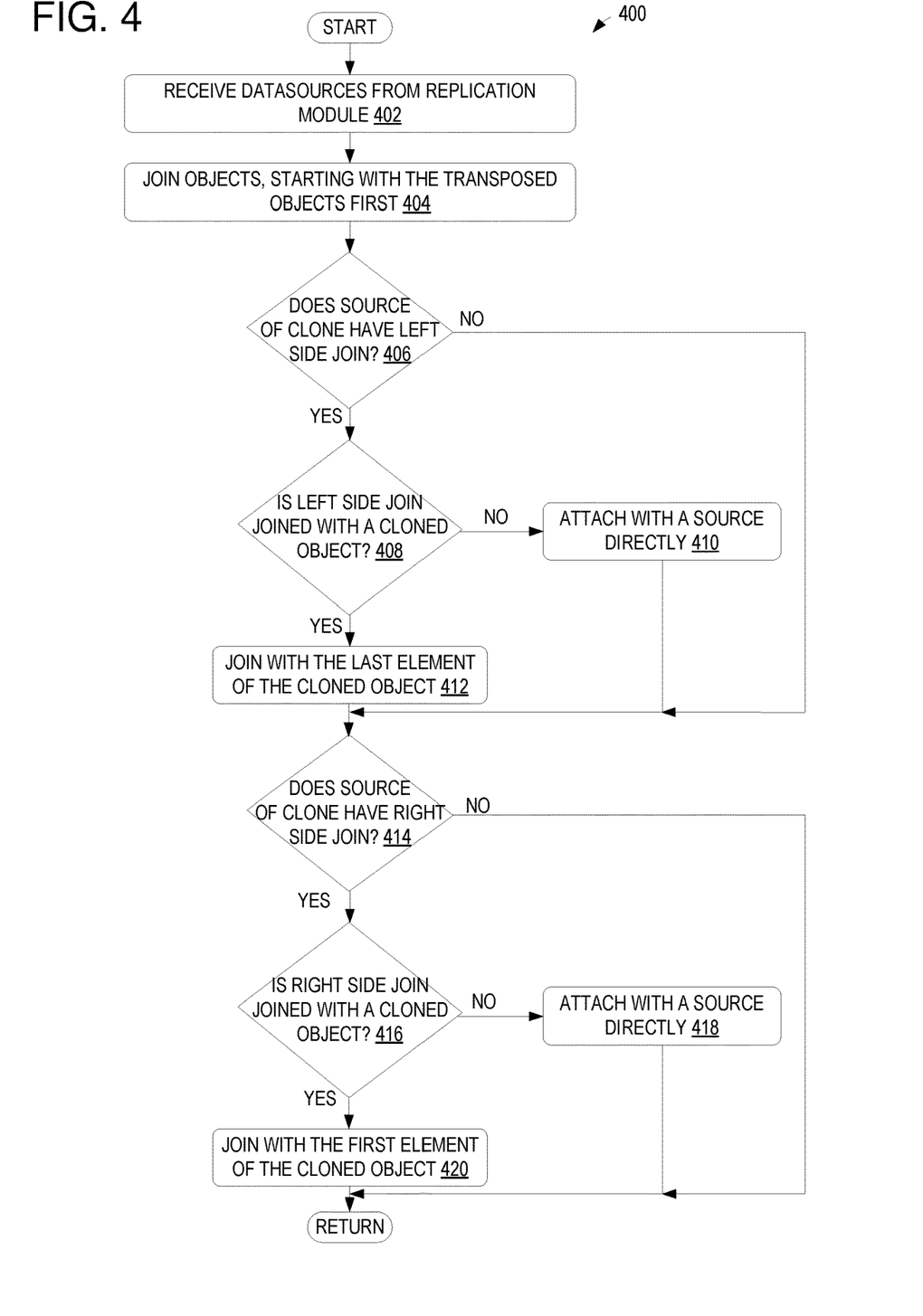
FIG. 4 is a flow chart of an example method for joining replicated data sources in order to generate a one-dimensional visualized reporting of data.

FIG. 4 is a flowchart of an example method 400 for joining the data in cartesian columns (e.g., the cartesian columns created as a result of method 300) to ensure that the correlation chain between the columns is not broken when generating a flat representation of the data. The method 400 may be performed by a join module (e.g., as described above with respect to FIG. 2). At 402, the method includes receiving data sources from the replication module.

At 404, the method includes joining objects in the data, starting with the transposed objects first. In order to ensure that the joined objects retain a proper correlation with one another, the joining process includes performing the following operations.

At 406, the method includes determining if the source of cloned data (e.g., generated by the replication module) has a left side join. If the source does have a left side join, the method includes, at 408, determining if the left side join is joined with a cloned object. If the left side join is not joined with a cloned object (e.g., "NO" at 408), the method includes attaching with the source directly, as indicated at 410. If the left side join is joined with a cloned object (e.g., "YES" at 408), the method includes joining with the last element of the cloned object, as indicated at 412.

After joining/attaching the left side join (or if the source of the clone does not have a left side join), the method includes determining if the source of the clone has a right side join, as indicated at 414. If the source does have a right side join, the method includes, at 416, determining if the right side join is joined with a cloned object. If the right side join is not joined with a cloned object (e.g., "NO" at 416), the method includes attaching with the source directly, as indicated at 418. If the right side join is joined with a cloned object (e.g., "YES" at 416), the method includes joining with the first element of the cloned object, as indicated at 420. The result of the above-described joining may be used by a report generator to visualize/report the data as a flat/one-dimensional list corresponding to the input to the replication module.

Example Scenarios

In a first example scenario, three data sources (X, Y, and Z) are used. Data source X is joined to Data source Y, which is joined to Data source Z (e.g., Data source X→Data source Y→Data source Z). One data source (Data source Y) takes two values (A and B) from a prompt dialog. Using the examples described above, the Data source Y may include Pay and may take two values: Full time and Day time. Since data source Y is the only data source to be transposed, only Data source Y is cloned (as described above with respect to FIG. 3). Accordingly, a replication module may output Data source Y-A and Data source Y-B (as well as original, non-cloned Data sources X and Z) to a join module for joining.

The source of the clone (e.g., Data source Y) has both a left join (to Data source X) and a right join (to Data source Z), so when joining according to method 400 of FIG. 4, the method may perform the operations along the "YES" path from decisions 406 and 414. However, neither of the cloned data sources are joined with a cloned object, so they are each attached directly to respective data sources (the left side is attached to Data source X directly and the right side is attached to Data source Z directly). Accordingly, the output of the join module is: Data source X→Data source Y-A→Data source Y-B→Data source Z, where the "→" indicates a joining between the corresponding data sources.

In a second example scenario, three data sources (X, Y, and Z) are again used. Data source X is joined to Data source Y, which is joined to Data source Z (e.g., Data source X→Data source Y→Data source Z). However, in this scenario, two data sources (Data source Y and Data source Z) each take two values (A and B) from a prompt dialog. Using the examples described above, the Data source Y may include Pay and may take two values: Full time and Day time and the Data source Z may include Stocks and may take two values: Full time and Day time. Since both Data sources Y and Z are to be transposed, they are both cloned (as described above with respect to FIG. 3), while Data source X is not cloned. Accordingly, a replication module may output Data source Y-A, Data source Y-B, Data source Z-A, and Data source Z-B (as well as original, non-cloned Data source X) to a join module for joining.

The source of the clone (e.g., Data source Y) has both a left join (to Data source X) and a right join (to Data source Z), so when joining according to method 400 of FIG. 4, the method may perform the operations along the "YES" path from decisions 406 and 414. The left side cloned data source (Y-A) is joined with Data source X, which is not a cloned object, so it is attached directly to Data source X. However, the right side cloned data source (Y-B) is joined with a cloned object (Data source Z), so it is joined with the last element of the cloned object (e.g., Data source Z-A). Data source Z only has a left join (to Data source Y), which is a cloned object, so it is joined with the last element of the cloned object (Data source Y-B). Accordingly, the output of the join module is: Data source X→Data source Y-A→Data source Y-B→Data source Z-A→Data source Z-B, where the "→" indicates a joining between the corresponding data sources.

Examples of User Interface Features

In implementing the above mechanisms, some challenges may arise from a user interface perspective. For example, data for different columns to be joined as described above may originate from different data sources, creating a compounding complication in linking the data. Further, in some systems, a user may build a query using predefined categories, which may not include combinations of categories of interest. In order to address these difficulties, the disclosed system includes a user interface that utilizes predefined metadata with established links therebetween. For example, the values for "Pay" may be dependent on a table that includes different employee types (e.g., as described above, different pay values may be defined for full time employees versus day time employees, etc.). Accordingly, in some examples, a user interface is provided in which a user requesting a visualized report of values is able to select from linked categories. An example of this functionality is described below.

Figure 5:
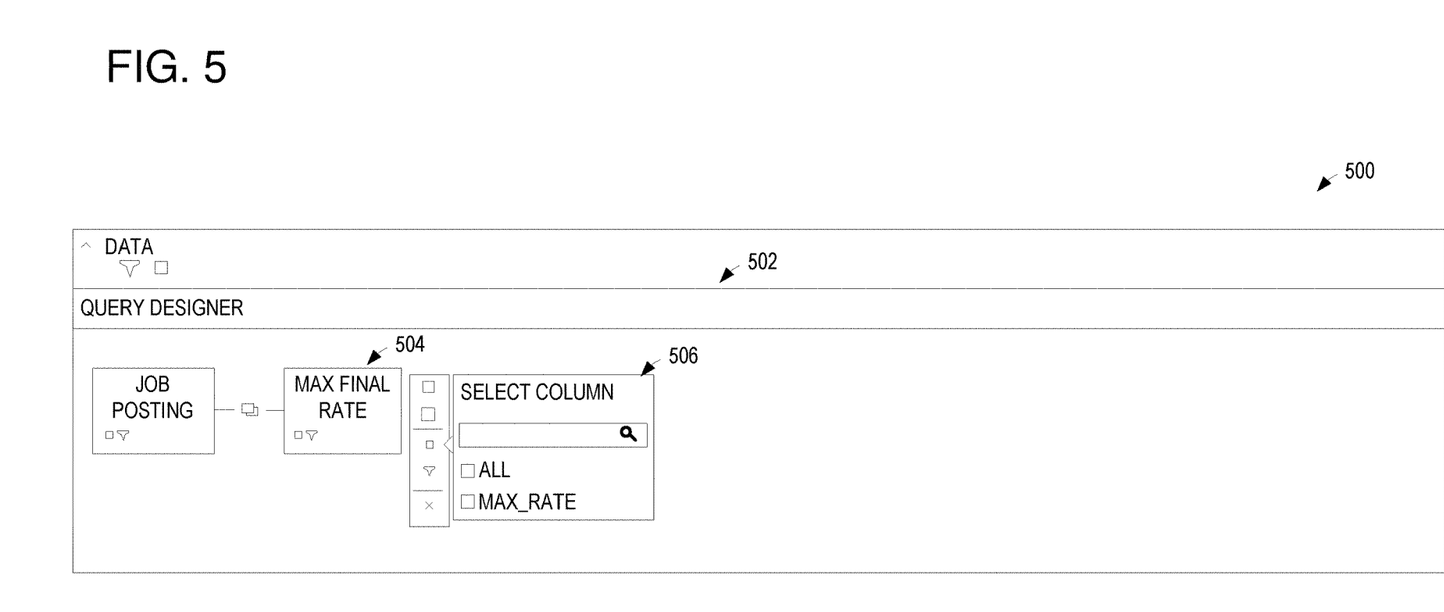
FIGS. 5-8 show example user interfaces for building queries for one-dimensional visualized reports of Cartesian data.

FIG. 5 shows an example portion of a user interface 500, which may be used to build a query for different types of data that originate from one or more data sources in a flat format. The user may select the headers for columns to be included in a visualized report, where each column of the report is to be populated with values from one or more data sources corresponding to the respective selected headers. For example, headers such as Pay, Stocks, Max Final Rate, Min Final Rate, etc. may define types of values that are stored in one or more data sources. As described above, in some cases, the requested columns may include Cartesian columns, which combine linked data from multiple data sources or multiple groups within a data source. For example, each of the above-described headers may have different sets of values for different employee types, where the values for the different employee types are stored in one or more different data sources. In the example of FIG. 5, a user may wish to calculate a "Max_Rate" (e.g., max rate of pay) for different categories of rates (e.g., different employee types) to include in a job posting. In such an example, the "Max Rate" data may be stored in a first data source, while the different employee types (e.g., full time, day time, etc.) may be stored in a second data source. Accordingly, the user may use a visualization tool, such as query builder 502 to select user interface objects corresponding to the desired base column(s) of values (e.g., "Max Final Rate" shown in box 504 may be dragged from a selection window and dropped into the builder). As shown, a menu 506 is provided to allow the user to select the desired data (e.g., "MAX_RATE") to be included in this base column. In some examples, a user may add new selectable data options by defining a data source and naming a column to be associated with that data source. Upon selecting a desired base column, a further dialog box is presented in the user interface to define linked columns for the base column, as shown in FIG. 6.

Figure 6:
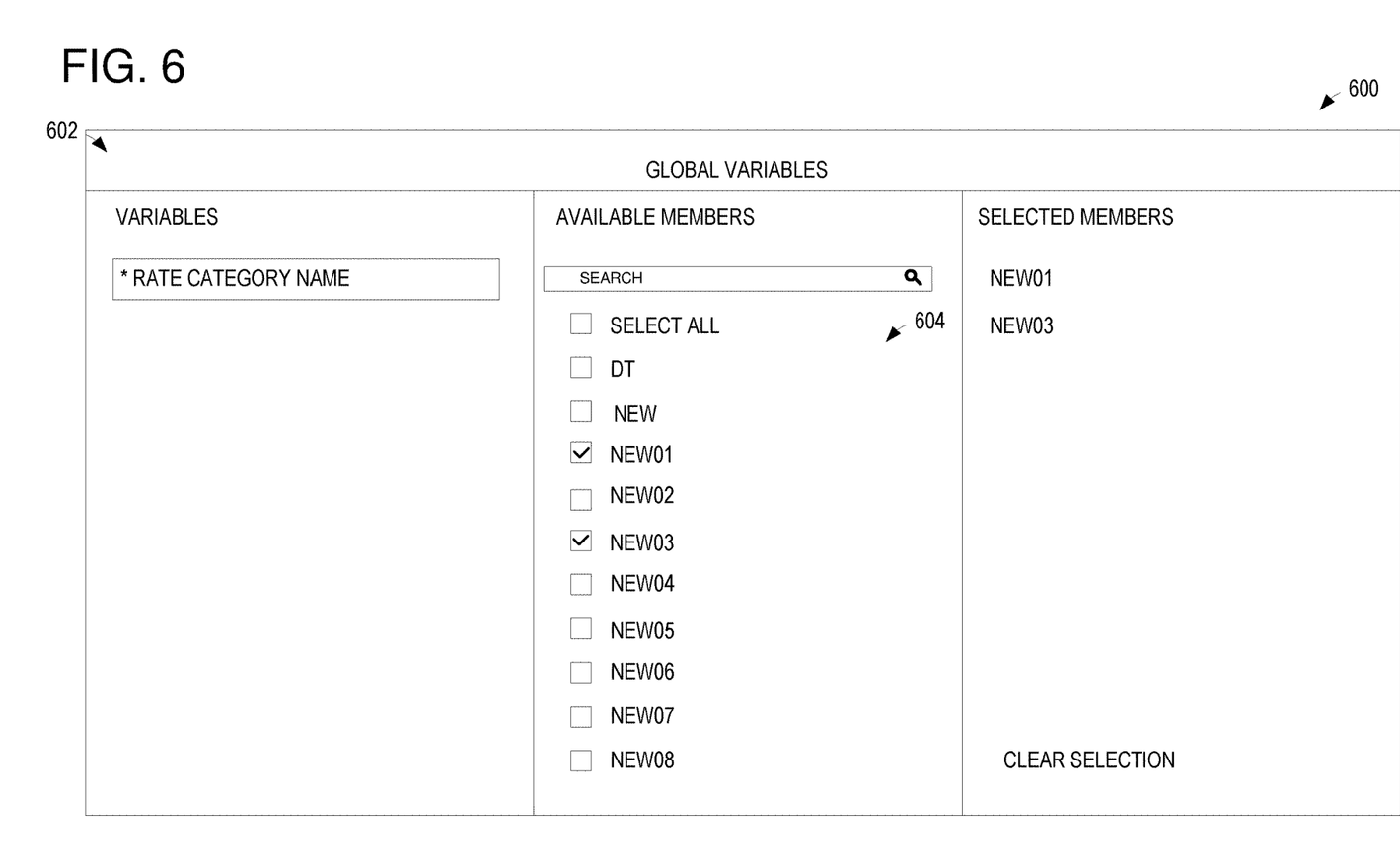

FIG. 6 shows an example portion of a user interface 600, which enables a user to select different, linked categories or subcategories of a base column selected via the previous user interface window shown in FIG. 5. For example, a dialog box 602 is launched based on the selection of inclusion of a "MAX_RATE" column in user interface 500, showing available members (e.g., transpose factors) 604 for the selected category. As shown, two members ("New01" and "New03") are selected, which results in a preview of the query shown in FIG. 7. In this way, the definition of Cartesian columns to be processed is streamlined to increase efficiency of the user interface, as the user does not drag and drop separate objects for each combined column/category. For example, in other systems, a user may drag and drop separate "Max Final Rate—New01" and "Max Final Rate—New03" boxes into the user interface shown in FIG. 5, which becomes even more tedious as the number of Cartesian columns increase. The approach shown herein enables a user to select all desired subcategories of a base column in one dialog box, thus, when at least one subcategory/linked column is selected, each object shown in the query designer interface of FIG. 5 represents a number of requested columns of values to be generated for a visualized report that is equal to the number of selections made in the dialog box of FIG. 6.

Figure 7:
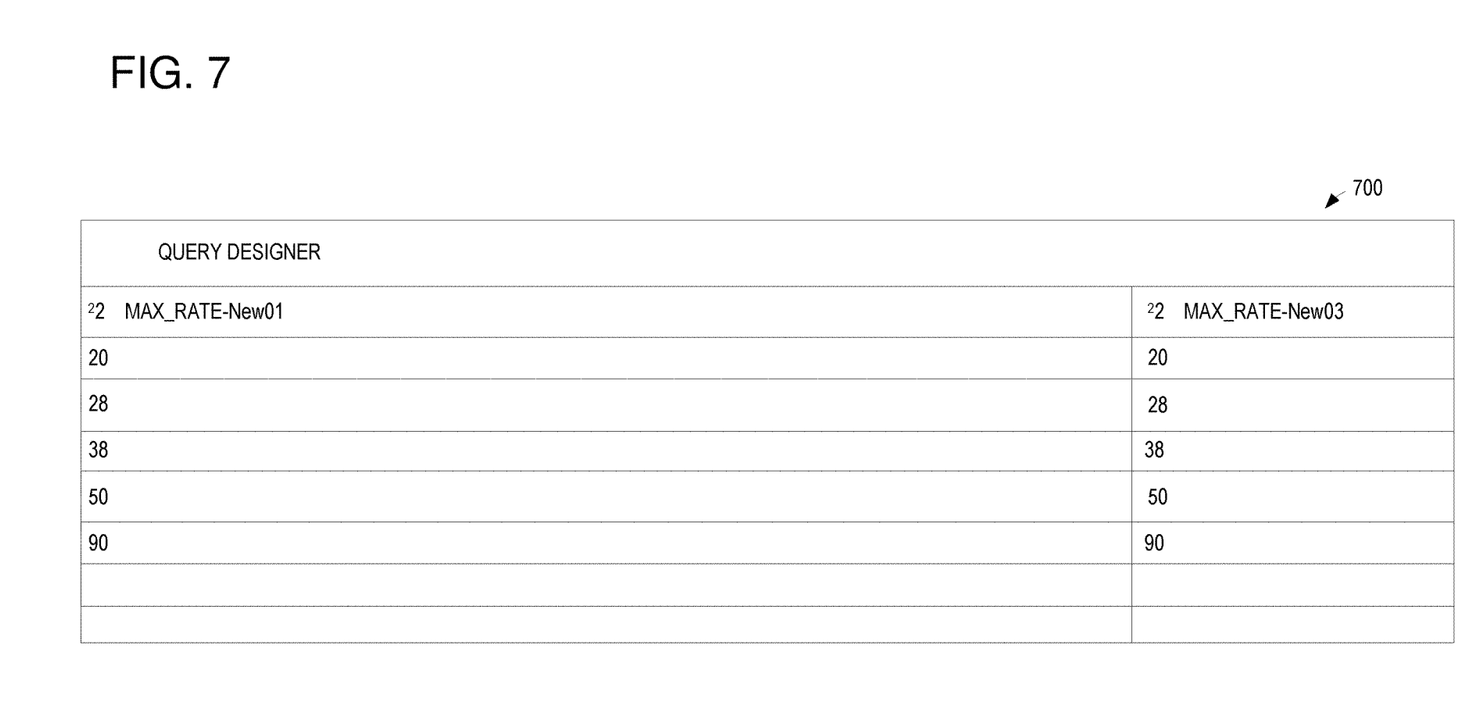

FIG. 7 shows an example portion of a user interface 700, which displays a preview of a query that is built using the query builder of FIGS. 5 and 6. As shown, the selected categories are presented as a flattened table, with the MAX_RATE for each selected transpose factor (New01 and New03) shown as column headers.

Figure 8:
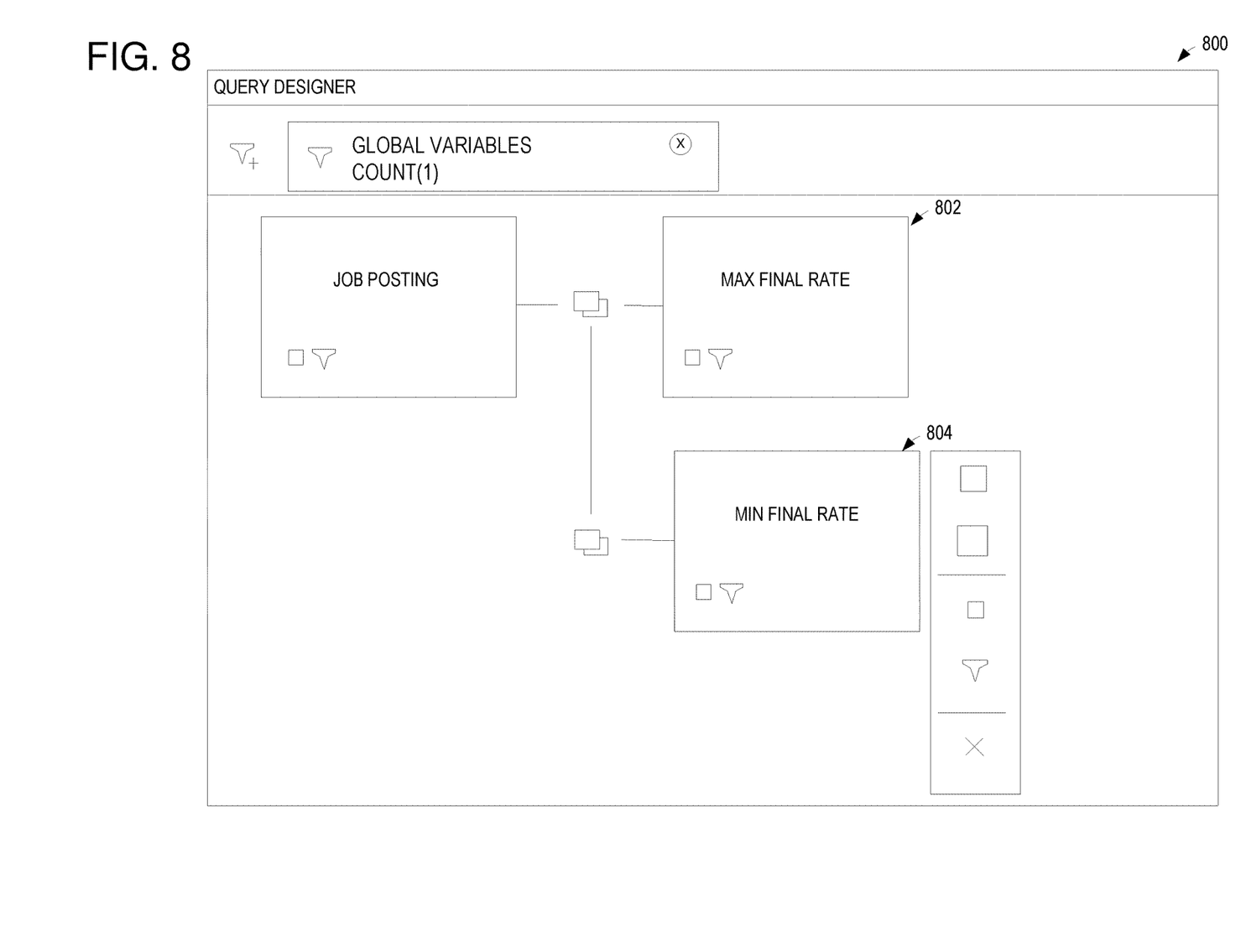

FIG. 8 shows an example portion of a user interface 800, in which a user is requesting to join the "Job Posting" object to "Max Final Rate" (user interface element 802 corresponding to a first data source) and "Min Final Rate" (user interface element 804 corresponding to a second data source) to generate a report of values relating to these categories. The positioning of the user interface elements 802 and 804 may represent how the data sources are to be joined in a join operation. In the illustrated example, the first data source is joined on the right with the second data source and the second data source is joined on the left with the first data source, with additional rules governing the joining if either or both data sources are to be cloned due to the selection of transpose factors. For example, each of the categories Max Final Rate and Min Final Rate may include transpose factors (e.g., Full Time and Day Time employee types), which increases the number of Cartesian values for the requested report. By selecting the two transpose factors for each of the selected categories using a dialog box such as the dialog box 602 of FIG. 6, the user may request a visualized report of Cartesian values that is replicated and joined in a similar manner as the second scenario described above (e.g., where the databases to be joined are X and Y; Max Final Rate and Min Final rate, respectively, and the transpose factors are Full Time and Day Time, so the final joining is Max Final Rate—Full Time→Max Final Rate—Day Time→Min Final Rate-Full Time→Min Final Rate—Day Time).

Further Implementation Examples

Figure 9:
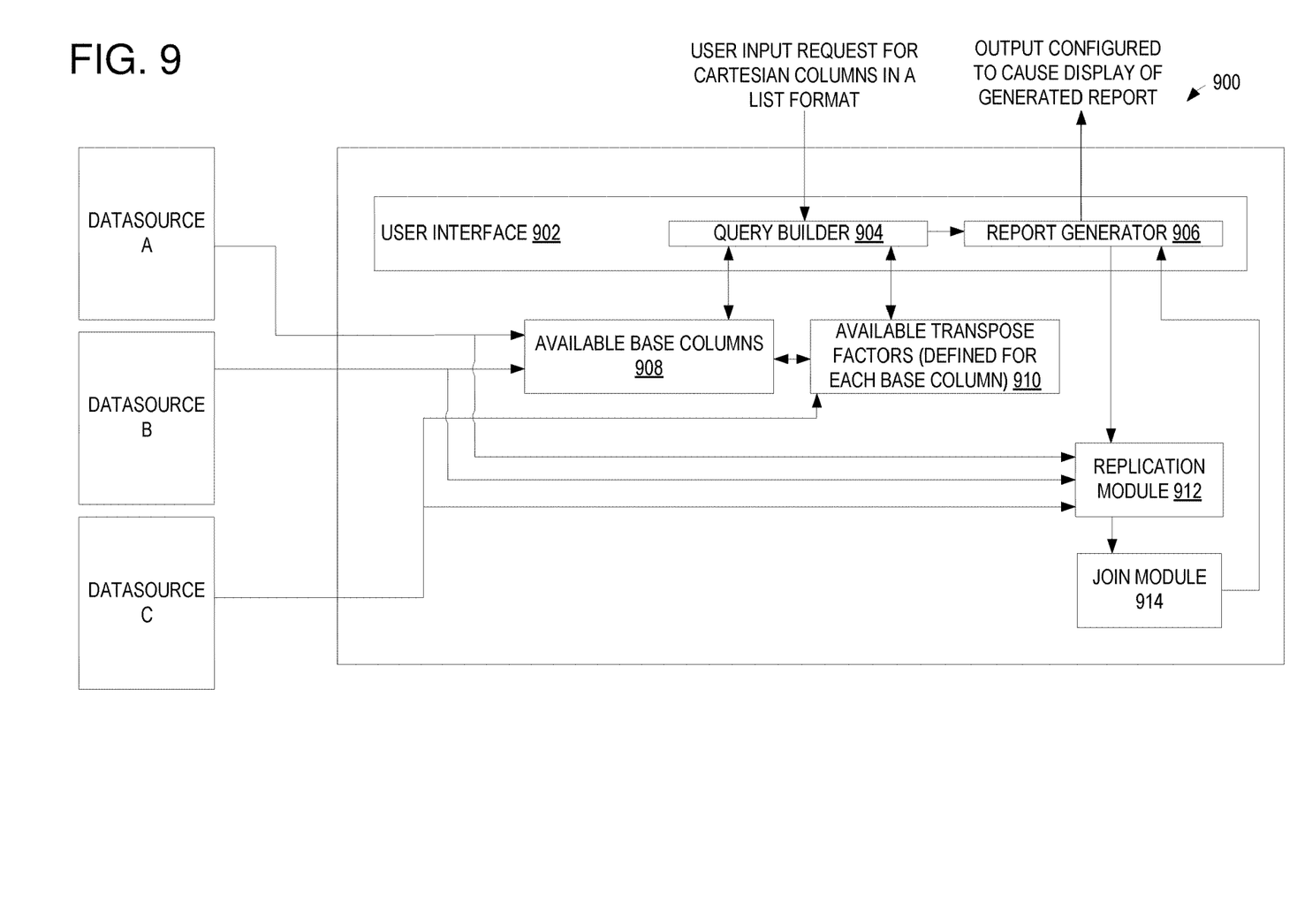
FIG. 9 shows an example operating environment for generating a one-dimensional visualized report of Cartesian data based on a user input request.

FIG. 9 shows an example block diagram of an operating environment 900 in which the disclosed technologies may be implemented in some examples. The operating environment includes a user interface 902, which includes a data visualization tool, such as query builder 904 and a report generator 906. The user interface 902 may be provided in the form of a graphical user interface, which includes user interface elements selectable by the user to request and view a visualization of data from different data sources. The query builder 904 provides an interface for accepting user input to request a visualized report of data, which may include Cartesian columns of data to be visualized/reported in a list format. As described above with reference to FIGS. 5-8, the query builder may provide an interface that enables a user to select (e.g., via an input device of a user computing system that is coupled to the operating environment 900 via the user interface 902) from available base columns 908 and, for each selected available base column, select from available transpose factors 910 associated with the selected available base column. In the illustrated example, the available base columns include data stored in data source A and data source B, while the available transpose factors are stored in data source C. It is to be understood that any suitable number of data sources may provide any combination of available base column data and available transpose factor data in other examples in accordance with this disclosure.

Upon receiving a selection of available base columns and available transpose factors, the query builder may send associated indicators of these selections to a report generator 906 for building a corresponding report. The report generator may provide the indications of the selections of the columns to a replication module 912, which may perform one or more of the operations of the method described above with respect to FIG. 3 to replicate each of the base columns (where applicable) by the number of transpose factors respectively selected for the base columns. These replicated (and non-replicated, for columns for which no transpose factors are selected) columns are then provided to a join module 914. The join module 914 may perform one or more operations of the method described above with respect to FIG. 4 to join the columns in accordance with the selections and generate a flat (e.g., one-dimensional, list structure) representation of the associated data. The join module 914 provides this representation of the data to the report generator 906, which formats the data into a visualized report output configured to cause display of the generated report to the user (e.g., via a the graphical user interface 902). For example, the report generator may output the one-dimensional report of the requested Cartesian columns to a display for presentation to the user that provided the user input.

A Generalized Computer Environment

Figure 10:
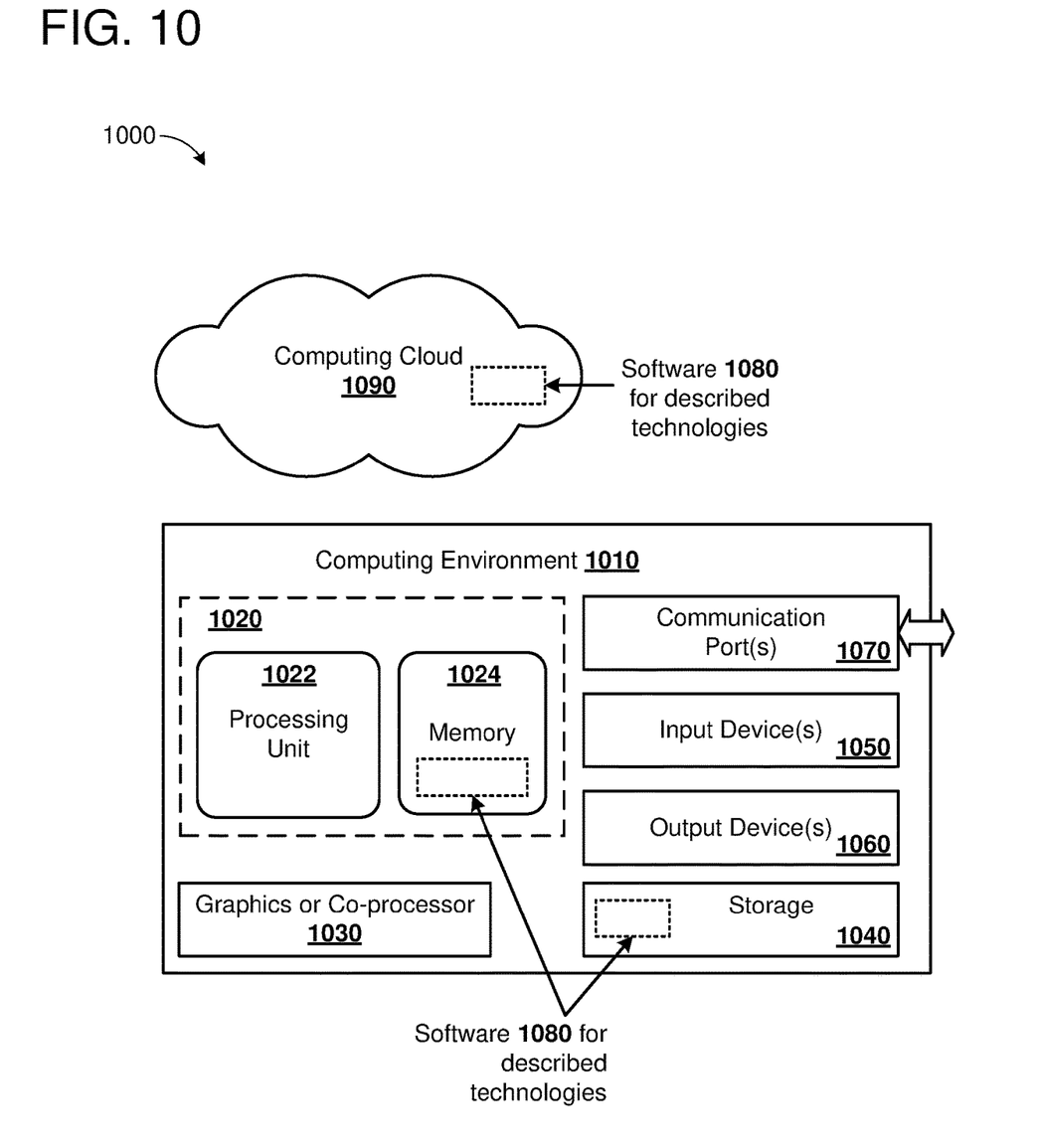
FIG. 10 shows an example computing environment in accordance with one or more examples of the present disclosure.

FIG. 10 illustrates a generalized example of a suitable computing system 1000 in which described examples, techniques, and technologies, including construction, query processing, and reporting of cartesian values according to disclosed technologies can be implemented. The computing system 1000 is not intended to suggest any limitation as to scope of use or functionality of the present disclosure, as the innovations can be implemented in diverse general-purpose or special-purpose computing systems.

With reference to FIG. 10, computing environment 1010 includes one or more processing units 1022 and memory 1024. In FIG. 10, this basic configuration 1020 is included within a dashed line. Processing unit 1022 executes computer-executable instructions, such as for implementing any of the methods or objects described herein for performing queries on a composite graph data structure representing a dynamic system, or various other architectures, components, handlers, managers, modules, or services described herein. Processing unit 1022 can be a general-purpose central processing unit (CPU), a processor in an application-specific integrated circuit (ASIC), or any other type of processor. In a multi-processing system, multiple processing units execute computer-executable instructions to increase processing power. Computing environment 1010 can also include a graphics processing unit or co-processing unit 1030. Tangible memory 1024 can be volatile memory (e.g., registers, cache, or RAM), non-volatile memory (e.g., ROM, EEPROM, or flash memory), or some combination thereof, accessible by processing units 1022, 1030. The memory 1024 stores software 1080 implementing one or more innovations described herein, in the form of computer-executable instructions suitable for execution by the processing unit(s) 1022, 1030. The memory 1024 can also store a number of Cartesian values, configuration data, UI displays, browser code, data structures including data tables, working tables, change logs, output structures, input fields, output fields, data values, indices, or flags, as well as other operational data.

A computing system 1010 can have additional features, such as one or more of storage 1040, input devices 1050, output devices 1060, or communication ports 1070. An interconnection mechanism (not shown) such as a bus, controller, or network interconnects the components of the computing environment 1010. Typically, operating system software (not shown) provides an operating environment for other software executing in the computing environment 1010, and coordinates activities of the components of the computing environment 1010.

The tangible storage 1040 can be removable or non-removable, and includes magnetic disks, magnetic tapes or cassettes, CD-ROMs, DVDs, or any other medium which can be used to store information in a non-transitory way and which can be accessed within the computing environment 1010. The storage 1040 stores instructions of the software 1080 (including instructions and/or data) implementing one or more innovations described herein.

The input device(s) 1050 can be a mechanical, touch-sensing, or proximity-sensing input device such as a keyboard, mouse, pen, touchscreen, trackball, a voice input device, a scanning device, or another device that provides input to the computing environment 1010. The output device(s) 1060 can be a display, printer, speaker, optical disk writer, or another device that provides output from the computing environment 1010.

The communication port(s) 1070 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 1000 can also include a computing cloud 1090 in which instructions implementing all or a portion of the disclosed technology are executed. Any combination of memory 1024, storage 1040, and computing cloud 1090 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, software objects, classes, components, data structures, etc. that perform tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

Example Cloud Computing Environment

Figure 11:
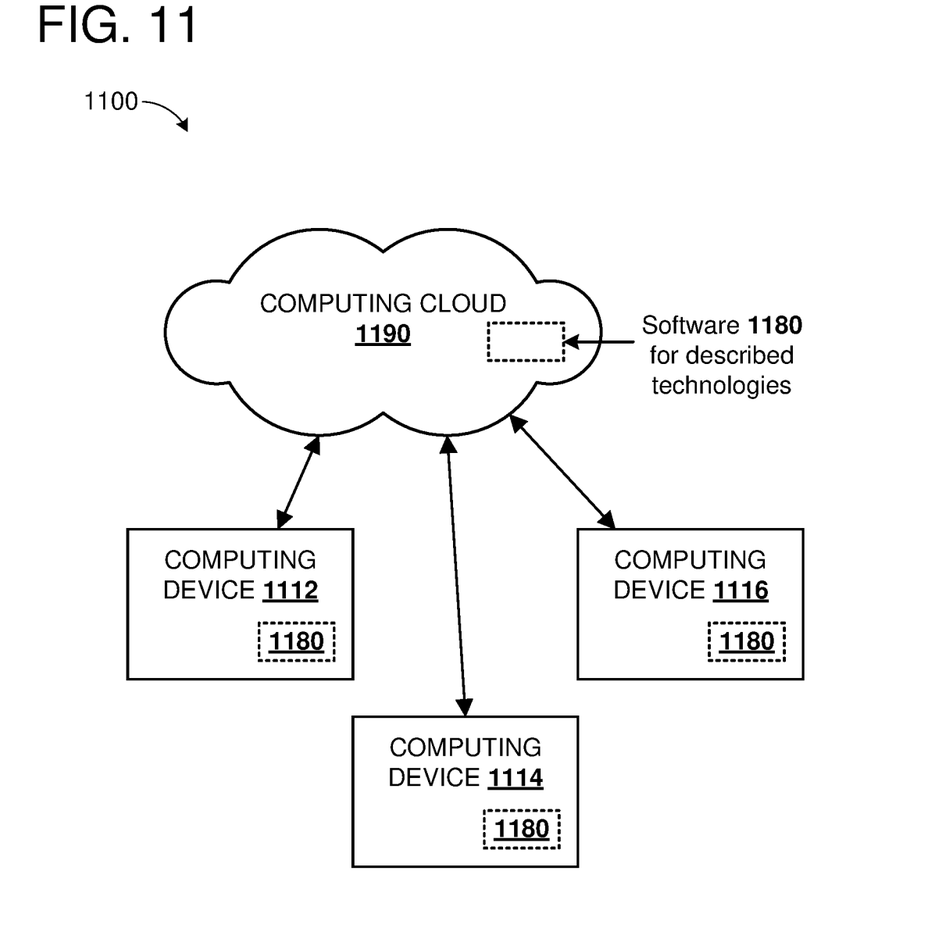
FIG. 11 shows an example cloud-computing environment in accordance with one or more examples of the present disclosure.

FIG. 11 depicts an example cloud computing environment 1100 in which the described technologies can be implemented. The cloud computing environment 1100 comprises a computing cloud 1190 containing resources and providing services. The computing cloud 1190 can comprise various types of cloud computing resources, such as computer servers, data storage repositories, networking resources, and so forth. The computing cloud 1190 can be centrally located (e.g., provided by a data center of a business or organization) or distributed (e.g., provided by various computing resources located at different locations, such as different data centers and/or located in different cities or countries).

The computing cloud 1190 can be operatively connected to various types of computing devices (e.g., client computing devices), such as computing devices 1112, 1114, and 1116, and can provide a range of computing services thereto. One or more of computing devices 1112, 1114, and 1116 can be computers (e.g., servers, virtual machines, embedded systems, desktop, or laptop computers), mobile devices (e.g., tablet computers, smartphones, or wearable appliances), or other types of computing devices. Communication links between computing cloud 1190 and computing devices 1112, 1114, and 1116 can be over wired, wireless, or optical links, or any combination thereof, and can be short-lived or long-lasting. Communication links can be continuous or sporadic. These communication links can be stationary or can move over time, being implemented over varying paths and having varying attachment points at each end. Computing devices 1112, 1114, and 1116 can also be connected to each other.

Computing devices 1112, 1114, and 1116 can utilize the computing cloud 1190 to obtain computing services and perform computing operations (e.g., data processing, data storage, and the like). Particularly, software 1180 for performing the described innovative technologies can be resident or executed in the computing cloud 1190, in computing devices 1112, 1114, and 1116, or in a distributed combination of cloud and computing devices.

General Considerations

As used in this disclosure, the singular forms "a," "an," and "the" include the plural forms unless the surrounding language clearly dictates otherwise. Additionally, the terms "includes" and "incorporates" mean "comprises." Further, the terms "coupled" or "attached" encompass mechanical, electrical, magnetic, optical, as well as other practical ways of coupling items together, and does not exclude the presence of intermediate elements between the coupled items. Furthermore, as used herein, the terms "or" and "and/or" mean any one item or combination of items in the phrase.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 12, computer-readable storage media include memory 1224, and storage 1240. The term computer-readable storage media does not include signals and carrier waves. In addition, the term computer-readable storage media does not include communication ports (e.g., 1270) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, Angular, C, C++, C#, Curl, Dart, Fortran, Go, Java, JavaScript, Julia, Lisp, Matlab, Octave, Perl, Python, R, Ruby, SAS, SPSS, WebAssembly, any derivatives thereof, or any other suitable programming language, or, in some examples, markup languages such as HTML or XML, or in any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method, implemented by a computing device, of visualizing data, comprising:
    receiving a request for a visualization of data from a plurality of data sources received through a visualization tool, the request specifying a number of transpose factors for at least a first data source of the plurality of data sources, the transpose factors including one or more categories or sub-categories of content in the plurality of data sources;
    replicating the first data source to generate a number of clones of the first data source that is equal to the number of transpose factors, each clone of the first data source corresponding to a combination of the first data source and a respective one of the transpose factors;
    joining the clones of the first data source with remaining data sources of the plurality of data sources according to a set of rules to generate a visualization of the data; and
    generating for display a report including the visualization of the data from the plurality of data sources, the visualization presenting the data in a flat, one-dimensional format comprising a plurality of column headers respectively corresponding to a respective clone of the first data source or a respective one of the remaining data sources of the plurality of data sources.

2. The method of claim 1, wherein the plurality of data sources is received via the visualization tool based on user input to a user interface, the user input selecting user interface objects respectively corresponding to each of the plurality of data sources.

3. The method of claim 2, wherein, for each of the user interface objects, the respective user interface object is selectable to trigger display of an associated dialog interface that presents selectable transpose factor options for the respective user interface object.

4. The method of claim 3, wherein the number of transpose factors for the first data source is specified by further user input directed toward the associated dialog interface for the user interface object corresponding to the first data source to select the transpose factors for the first data source, and wherein the flat, one-dimensional format includes representations of Cartesian columns that combine linked data from the plurality of data sources.

5. The method of claim 2, wherein an order of the plurality of data sources for joining is defined based on the user input selecting the user interface objects for the plurality of data sources.

6. The method of claim 5, wherein joining the clones of the first data source with the plurality of data sources according to the set of rules comprises: determining that the first data source is joined on the left side to a target data source, and, for a first clone of the first data source, responsive to determining that the target data source is cloned, joining the first clone of the first data source to a last clone of the target data source, and responsive to determining that the target data source is not cloned, joining the first clone of the first data source to the target data source directly.

7. The method of claim 5, wherein joining the clones of the first data source with the plurality of data sources according to the set of rules comprises: determining that the first data source is joined on the right side to a target data source, and, for a last clone of the first data source, responsive to determining that the target data source is cloned, joining the last clone of the first data source to a first clone of the target data source, and responsive to determining that the target data source is not cloned, joining the last clone of the first data source to the target data source directly.

8. The method of claim 1, wherein joining the clones of the first data source with the plurality of data sources according to the set of rules comprises joining cloned data sources of the plurality of data sources before joining non-cloned data sources of the plurality of data sources.

9. One or more computer-readable storage media storing computer-executable instructions for visualizing data, the instructions comprising instructions to:
generate a graphical user interface for display, the graphical user interface comprising selectable user interface objects respectively corresponding to each of a plurality of data sources;
generate a request for a visualization of data from a subset of the plurality of data sources that are selected via user input, the request specifying a number of transpose factors for at least a first data source of the subset of data sources based on further user input to a dialog box that is generated responsive to a selection of the first selectable user interface object corresponding to the first data source, the transpose factors including one or more categories or sub-categories of content in the plurality of data sources;
provide the request indicating the data from the subset of data sources and the transpose factors to a backend service including a replication module that clones the first data source to generate a number of clones of the first data source that is equal to the number of transpose factors and a join module;
receive, from the backend service, a visualization of the data from the subset of data sources, the visualization showing the data in a flat, one-dimensional representation of cartesian columns of the data generated by joining of the clones of the first data source using the join module; and
present, in the graphical user interface, a report including the visualization of the data.

10. The one or more computer-readable storage media of claim 9, wherein an order of the subset of data sources for joining to generate the visualization is defined based on the user input selecting the user interface objects for the subset of data sources.

11. The one or more computer-readable storage media of claim 10, wherein each clone of the first data source corresponds to a combination of the first data source and a respective one of the transpose factors.

12. The one or more computer-readable storage media of claim 11, wherein the join module of the backend service is configured to join the clones of the first data source with remaining data sources of the subset of data sources according to a set of rules.

13. The one or more computer-readable storage media of claim 12, wherein joining the clones of the first data source with the subset of data sources according to the set of rules comprises: determining that the first data source is joined on the left side to a target data source, and, for a first clone of the first data source, responsive to determining that the target data source is cloned, joining the first clone of the first data source to a last clone of the target data source, and responsive to determining that the target data source is not cloned, joining the first clone of the first data source to the target data source directly.

14. The one or more computer-readable storage media of claim 12, wherein joining the clones of the first data source with the subset of data sources according to the set of rules comprises: determining that the first data source is joined on the right side to a target data source, and, for a last clone of the first data source, responsive to determining that the target data source is cloned, joining the last clone of the first data source to a first clone of the target data source, and responsive to determining that the target data source is not cloned, joining the last clone of the first data source to the target data source directly.

15. The one or more computer-readable storage media of claim 12, wherein joining the clones of the first data source with the subset of data sources according to the set of rules comprises joining cloned data sources of the subset of data sources before joining non-cloned data sources of the subset of data sources.

16. A system comprising:
one or more processors; and
one or more computer-readable storage media storing computer-readable instructions that, when executed by the one or more processors, perform operations comprising:
generating a graphical user interface for display, the graphical user interface comprising selectable user interface objects respectively corresponding to each of a plurality of data sources;
generating a request for a visualization of data from a subset of the plurality of data sources that are selected via user input, the request specifying a number of transpose factors for at least a first data source of the plurality of data sources based on additional user input to a dialog box that is generated responsive to a selection of the first selectable user interface object corresponding to the first data source, the transpose factors including one or more categories or sub-categories of content in the plurality of data sources;

cloning the first data source to generate a number of clones of the first data source that is equal to the number of transpose factors, each clone of the first data source corresponding to a combination of the first data source and a respective one of the transpose factors, joining the clones of the first data source with remaining data sources of the subset of data sources according to a set of rules to generate a visualization of the data, wherein the subset of data sources are joined with one another in positions that are defined based on the user input selecting the user interface objects for the subset of data sources, and generating for display via the graphical user interface a report including the visualization of the data from the subset of data sources, the visualization presenting the data in a flat, one-dimensional format.

17. The system of claim 16, wherein joining the clones of the first data source with the subset of data sources according to the set of rules comprises: determining that the first data source is joined on the left side to a target data source, and, for a first clone of the first data source, responsive to determining that the target data source is cloned, joining the first clone of the first data source to a last clone of the target data source, and responsive to determining that the target data source is not cloned, joining the first clone of the first data source to the target data source directly.

18. The system of claim 16, wherein joining the clones of the first data source with the subset of data sources according to the set of rules comprises: determining that the first data source is joined on the right side to a target data source, and, for a last clone of the first data source, responsive to determining that the target data source is cloned, joining the last clone of the first data source to a first clone of the target data source, and responsive to determining that the target data source is not cloned, joining the last clone of the first data source to the target data source directly.

19. The system of claim 16, wherein the request further specifies a respective number of transpose factors for a second data source of the subset of data sources based on further additional user input to second dialog box that is generated responsive to a selection of a second selectable user interface object corresponding to second data source.

20. The system of claim 16, wherein the visualization of the data comprises a list structure of data source entries, each entry of the list structure having a name corresponding to a non-cloned data source of the subset of data sources or a combination of a cloned data source of the subset of data sources with a respective transpose factor for the cloned data source.

* * * * *